US010216842B2

(12) United States Patent
Dai et al.

(10) Patent No.: US 10,216,842 B2
(45) Date of Patent: Feb. 26, 2019

(54) METHOD FOR CLUSTERING RESULTS FROM A SAME CHANNEL

(71) Applicant: Google Inc., Mountain View, CA (US)

(72) Inventors: Minya Dai, Milpitas, CA (US); Nitin Khandelwal, Mountain View, CA (US); Nitin Jindal, Mountain View, CA (US); Neal Norwitz, Mountain View, CA (US); Matthew Smith, Mountain View, CA (US); Trevor O'Brien, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 913 days.

(21) Appl. No.: 13/908,727

(22) Filed: Jun. 3, 2013

(65) Prior Publication Data

US 2014/0358907 A1 Dec. 4, 2014

(51) Int. Cl.
*G06F 17/30* (2006.01)

(52) U.S. Cl.
CPC .................. *G06F 17/3084* (2013.01)

(58) Field of Classification Search
None
See application file for complete search history.

(56) References Cited

U.S. PATENT DOCUMENTS

| 8,326,841 | B2 | 12/2012 | Ott, IV et al. |
| 2002/0023122 | A1* | 2/2002 | Polizzi ............. G06F 17/30873 709/202 |
| 2007/0143155 | A1* | 6/2007 | Whitsett ................ G06Q 10/02 705/5 |
| 2008/0270449 | A1 | 10/2008 | Gossweiler et al. |
| 2009/0055385 | A1* | 2/2009 | Jeon ................... H04N 5/44543 |
| 2009/0270395 | A1 | 10/2009 | Colucci et al. |
| 2009/0313228 | A1 | 12/2009 | Grandhi et al. |

(Continued)

FOREIGN PATENT DOCUMENTS

EP 2045738 A1 4/2009

OTHER PUBLICATIONS

International Searching Authority, "Notification of Transmittal of the International Search Report and the Written Opinion of the International Search Authority, or the Declaration," for International Application No. PCT/US2014/040758, dated Oct. 8, 2014, 11 pages.

(Continued)

*Primary Examiner* — Thu N Nguyen
(74) *Attorney, Agent, or Firm* — Lowenstein Sandler LLP (57) ABSTRACT

An initial plurality of search results is obtained based on a search query pertaining to a topic of interest. A determination is made of whether to perform clustering on the initial plurality of search results. Upon determining not to perform clustering on the search result, a user interface with the initial plurality of search results is provided. Upon determining to perform clustering on the initial plurality of search results, a user interface with a modified plurality of search results is provided. The user interface is to position a first result in the modified plurality of search results adjacent to a position of a second search result in the modified plurality of search results. The first search result is associated with a channel and the second search result is associated with the channel.

21 Claims, 5 Drawing Sheets

(56) References Cited

U.S. PATENT DOCUMENTS

| | | | |
|---|---|---|---|
| 2010/0070523 A1* | 3/2010 | Delgo | G06F 17/3079 707/769 |
| 2011/0225156 A1 | 9/2011 | Pavlik | |
| 2011/0313990 A1* | 12/2011 | Valdes-Perez | G06F 17/30598 707/706 |
| 2011/0321072 A1 | 12/2011 | Patterson et al. | |
| 2012/0016877 A1 | 1/2012 | Vadrevu et al. | |

OTHER PUBLICATIONS

Extended European Search Report for Application No. 14808416.3 dated Jan. 1, 2017, 7 pages.

* cited by examiner

METHOD FOR CLUSTERING RESULTS FROM A SAME CHANNEL

TECHNICAL FIELD

Embodiments of the present disclosure relate to the field of media item hosting services and, more particularly, to a method for clustering results from a same channel.

BACKGROUND

On the Internet, content hosting services or other applications allow users to upload, view, and share data content. Such data content may include audio clips, movie clips, TV clips, and music videos, as well as content such as blogs, social media pages, short original videos, pictures, photos, articles, avatars, software programs, games, etc.

Media items, or data content, can be provided to a user through channels. A channel can be media items available from a common source or media items having common properties, subject, or theme. A user that is interested in a topic can submit a search query for content pertaining to the topic. The content hosting service or application can return a search result including multiple media items for a user to view. The search results are generally ordered based on how related the search results are to the topic.

SUMMARY

In one embodiment, a method to cluster results from a same channel is presented. An initial plurality of search results is obtained based on a search query pertaining to a topic of interest. A determination is made of whether to perform clustering on the initial plurality of search results. Upon determining not to perform clustering on the search result, a user interface with the initial plurality of search results is provided. Upon determining to perform clustering on the initial plurality of search results, a user interface with a modified plurality of search results is provided. The user interface is to position a first result in the modified plurality of search results adjacent to a position of a second search result in the modified plurality of search results. The first search result is associated with a channel and the second search result is associated with the channel.

In additional embodiments, computing devices for performing the operations of the above described embodiments are also implemented. Additionally, in embodiments of the disclosure, a computer readable storage media stores methods for performing the operations of the above described embodiments.

BRIEF DESCRIPTION OF THE DRAWINGS

The present disclosure will be understood more fully from the detailed description given below and from the accompanying drawings of various embodiments of the disclosure.

DETAILED DESCRIPTION

Embodiments of the disclosure pertain to clustering results of a same channel. A channel can be one or more media items available from a common source or one or more media items having common properties, subject, or theme. A user that is interested in a topic can submit a request for the topic. The topic can be a subject, a source, or theme. For example, the topic can be a specific subject, such as musician, workout style, animal, writer, etc. or a general subject such as music, health, etc. In another example, the topic can be a source, such as a creator of the channel. In yet another example, the topic can be a theme, such as art, literature, etc. A group of search results can be obtained that is related to the topic. Each search result can be a channel or a media item associated with a channel. The search results are generally ordered based on how related the search results are to the topic. The search results are not clustered or grouped on a per-channel basis, therefore making it difficult to ascertain if multiple search results are associated with the same channel.

Accordingly, aspects of the present disclosure allow for clustering or grouping multiple search results from the same channel. An initial group of search results is obtained pertaining to a topic of interest. A determination is made of whether to perform clustering on the initial group of search results. Upon determining not to perform clustering on the search result, a user interface is provided with the initial plurality of search results, which does not include clustering of results from the same channel. Upon determining to perform clustering on the initial group of search results, the initial group of search results is modified to create a modified group of search results that clusters the search results from the same channel. The modified group of search results is provided in a user interface. The search results from the same channel are clustered such that the search results from the same channel are positioned adjacent to each other.

Clustering search results associated with or related to the same channel provides several advantages. Each search result can represent a media item, such as video content, audio content, etc. The scanning pattern for a user is improved because it is easy for the user to see media items associated with the same channel. In addition, the quality of media items associated with the same channel is validated because the media items are associated with a channel that is prominent and is a trustworthy source of media items associated with the topic. Moreover, the quality of the channel is validated because multiple search results are associated with the channel. Furthermore, the subscription for the channel is improved because a user will be more likely to subscribe to a channel if the user can easily see that many media items from the channel are in the search results.

Figure 1:
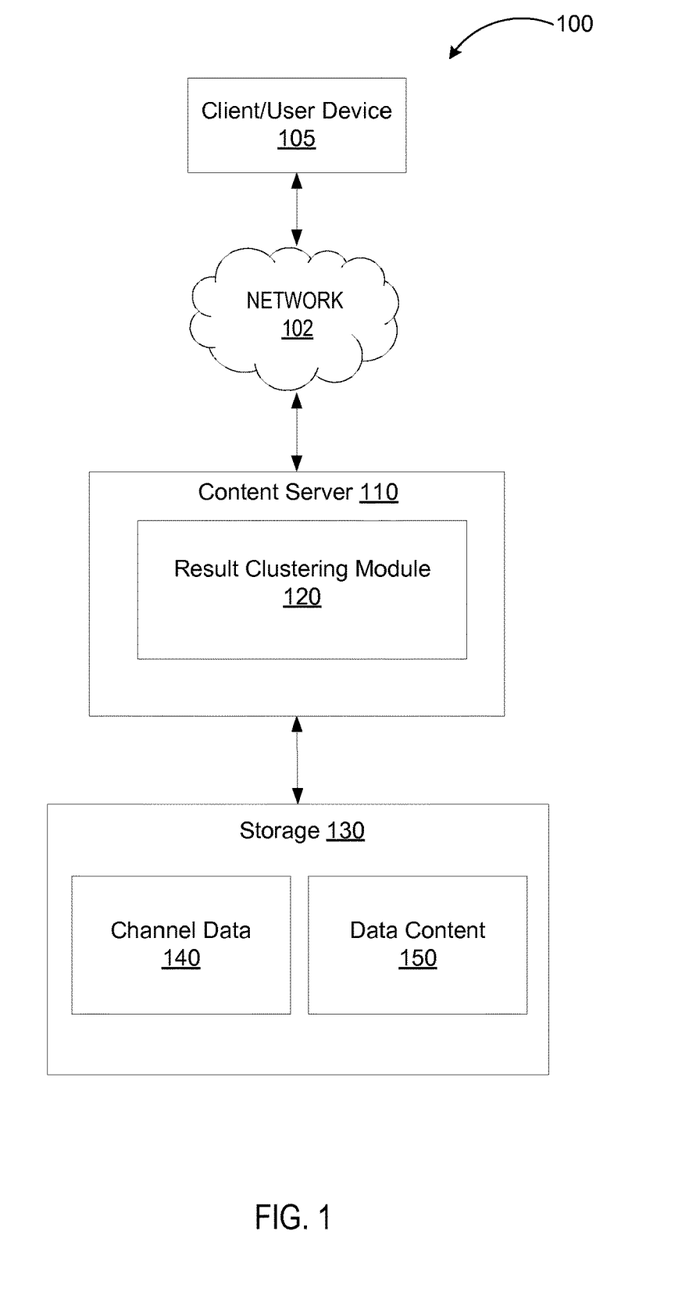
FIG. 1 illustrates an example system architecture, in accordance with one embodiment of the present disclosure.

FIG. 1 illustrates an example system architecture 100, in accordance with one embodiment of the present disclosure. System 100 comprises a client/user device 105 in communication with (e.g., coupled to) a content server 110 over a network 102, and a storage 130. The network 102 may be a private network (e.g., a local area network (LAN), a wide area network (WAN), intranet, etc.), a corporate network (e.g., a private network for an organization such as a corporation), a broadcast network, a public network (e.g., the Internet), a wired network (e.g., Ethernet network), a wireless network (e.g., an 802.11 network) and/or a cellular network (e.g., a Long Term Evolution (LTE) network).

The client/user device 105 may be any type of computing device, for example, a device including a processor, a computer-readable medium, and a memory. In some embodiments, the client/user device 105 may be executing a browser application or other application adapted to communicate over Internet related protocols (e.g., TCP/IP and HTTP) and/or display a user interface. While only a single client/user device 105 is shown in FIG. 1, system 100 may support a large number of concurrent sessions with many client/user devices 105.

The content server 110 may include computing devices that have a wide range of processing capabilities such as a personal computer (PC), a server computer, a personal digital assistant (PDA), a smart phone, a laptop computer, a netbook computer, a tablet device, and/or any machine capable of executing a set of instructions (sequential or otherwise) that specify actions to be taken by that machine. Embodiments of the disclosure may operate within a single server device or on multiple server devices. Embodiments of the disclosure may operate as a standalone system.

In one embodiment, the content server 110 receives a request from the client/user device 105 for a topic of interest. The topic can be, for example, a subject, a source, or theme. For example, the content server 110 may receive a request from the user on the client/user device 105 via the network 102. In response to the request, the content server 110 obtains a search result for the topic of interest. The content server 110 provides the search result pertaining to a topic to one or more of the client/user device 105. In some embodiments, the content server 110 can provide the search result in a user interface to be rendered by web browser executing on the client/user device 105. In some embodiments, the content server 110 can provide the search results in a document to be rendered by the client/user device 105.

Storage 130 can include one or more writable persistent storage devices, such as memories, tapes or disks. Although each of content server 110 and storage system 130 are depicted in FIG. 1 as single, disparate components, these components may be implemented together in a single device or networked in various combinations of multiple different devices that operate together. Examples of devices may include, but are not limited to, servers, mainframe computers, networked computers, process-based devices, and similar type of systems and devices.

Storage 130 may include channel data 140 and data content 150. Channel data 140 may include identification information for various channels, such as an identifier of the channel (e.g., name), one or more identifiers (e.g., names) of media items associated with the channel (e.g., media items selected by an entity that owns the channel), and one or more topics associated with the channel (e.g., topics related to the media items associated with the channel). Data content 150 can include selections of data content available to the content server 110, such as digital videos (e.g., music, television shows, movies, etc.), streaming videos (e.g., music, television shows, movies, etc.), images, digital audio (e.g., music, television shows, movies, etc.), streaming audio (e.g., music, television shows, movies, etc.), social media information (e.g., blogs, social media service postings, etc.), newsletters, etc. The selections of data content can be chosen by a channel curator, made available by a channel curator, uploaded by a channel curator, chosen by a channel curator, chosen by a channel curator r, etc. A channel curator can manage a channel and can be a professional entity (e.g., a content service provider, a broadcaster) or an amateur entity (e.g., an individual user).

In embodiments of the disclosure, the content server 110 notifies end users of the types of inform ion that are stored on storage 130, and provides the end users the opportunity to choose not to have such information collected, analyzed, and/or shared.

During operation of system 100, a user accesses system 100 via client/user device 105 over network 102. The content server 110 receives communications from the client/user device 105, and processes and/or directs these communications accordingly.

As discussed above, conventionally, Internet users can be provided an initial group of search results in a particular order, such as by a relation of the search results to a topic requested by the user. However, a user cannot easily ascertain which of the search results in the initial group of search results are associated with a same channel. Embodiments of the present disclosure address this problem by modifying the initial group of search results to create a modified group of search results. The modified group of search results clusters search results associated with a particular channel. The modified group of search results can be presented to a user in response to user's request for the topic.

In particular, in one embodiment, in response to a user requesting a topic, the content server 110 provides the client/user device 105 with a group of search results for a topic of interest to present to a user. In one embodiment, the content server 110 includes a result clustering module 120 that determines the group of search results for the topic of interest. In one embodiment, the result clustering module 120 can determine the group of search results for the topic of interest by obtaining an initial group of search results for the topic of interest, determining whether to perform clustering on the initial group of search results, presenting the initial group of search results upon determining not to perform clustering on the initial group of search results, modifying the initial group of search results to create a modified group of search results that clusters results associated with a same channel upon determining to perform clustering on the initial group of search results.

The result clustering module 120 can obtain the initial group of search results from a search engine (not shown). The result clustering module 120 can determine whether to perform clustering on the initial group of search results based on a position range of one or more results associated with a channel, a ranking position of one or more results associated with the channel, based on the topicality of the channel, etc. The position range can be a variable range of the position of results in the initial group of search results that are associated with a channel. The ranking position of a result is the ranking or position of the result in the initial group of search results. The topicality of the channel defines a relation of the topic to one or more topics associated with the channel.

Upon determining to perform clustering on the initial group of search results, the result clustering module 120 can modify the search result to cluster the results associated with a channel. In one embodiment, the result clustering module 120 modifies the initial group of search results to create a modified group of search results that clusters results associated with a channel by identifying the results associated with the channel to include in the cluster, determining whether to include the channel in the cluster, determining a position in the modified group of search results to include the cluster, and including the cluster at the determined position in the modified group of search results. The clustering module 120 can cause the modified group of search results to be presented or provided in a user interface on client/user device 105. The clustering module 120 can cause the modified group of search results to be presented or provided to convey to a user that the results associated with the same channel are grouped or clustered.

Figure 2:
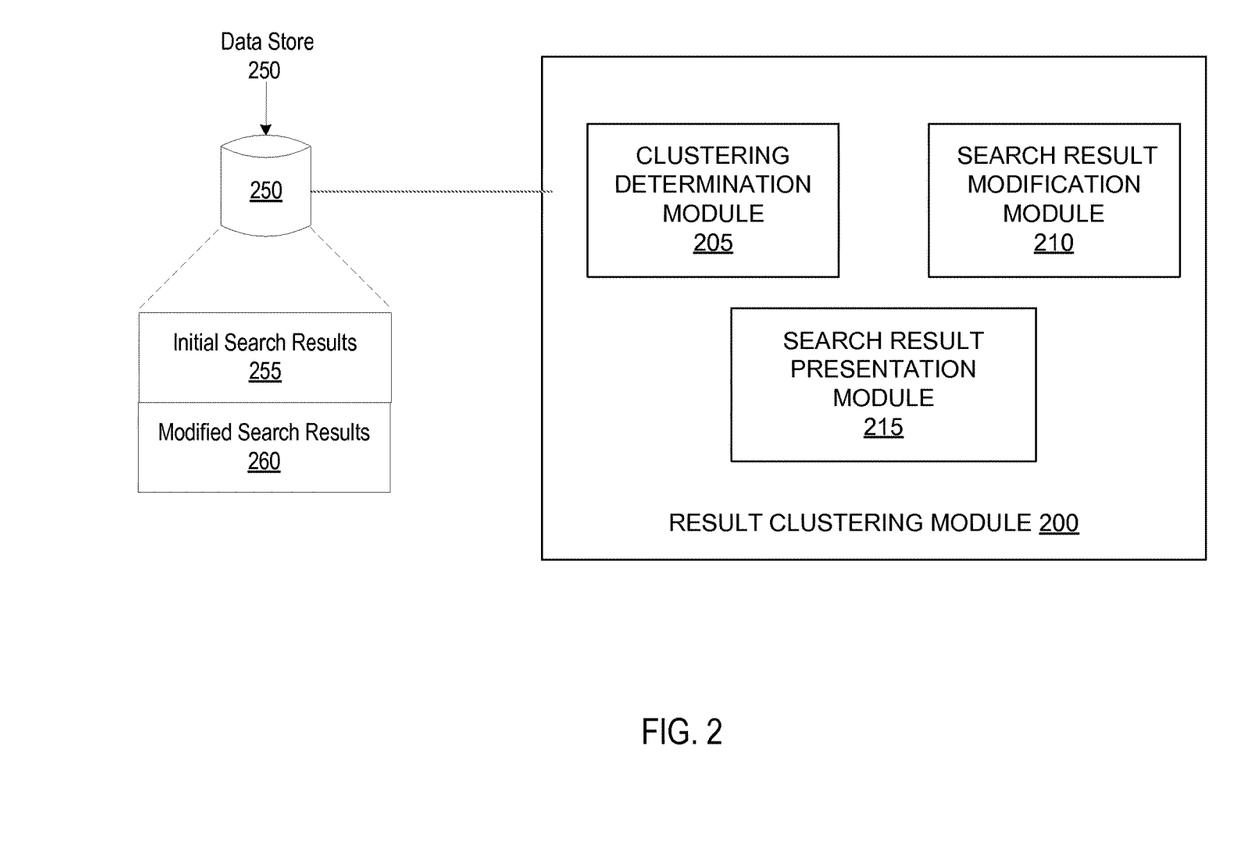
FIG. 2 illustrates a result clustering module, in accordance with one embodiment of the present disclosure.

FIG. 2 illustrates a result clustering module 200, in accordance with one embodiment of the present disclosure. The result clustering module 200 may include a clustering determination module 205, a search result modification module 210, and a search result presentation module 215. More or less components may be included in the result clustering module 200 without loss of generality.

The clustering determination module 205 may obtain initial search results in response to a user request for a topic of interest and determine whether to perform clustering on the initial search results. In one embodiment, the clustering determination module 205 obtains the initial search results from a data store, such as initial search result 255 in data store 250. In another embodiment, the clustering determination module 205 obtains the initial search results from other computing devices (e.g., other servers not shown in the figures, such as a datacenter) via a network (e.g., network 102 shown in FIG. 1) or may obtain the search result from a memory (e.g., a hard disk, flash memory, random access memory (RAM), etc.). The clustering determination module 205 can determine whether to perform clustering on the initial search results based on a position range of results associated with a channel, a ranking position of one or more results associated with the channel, based on the topicality of the channel, etc. The position range can be a variable range of the position of results in the initial search results associated with a channel. The ranking position of a result is the ranking or position of the result in search results. For example, if a result is listed in the fifth position of the search results, the ranking or position of the result is 5. The topicality of the channel defines a relation of the topic to one or more topics associated with the channel.

The search result modification module 210 can modify the initial search results, such as initial search result 255 in data store 250, to create a modified search result that cluster results associated with a channel, such as modified search results 260 in data store 250. In one embodiment, the search result modification module 210 modifies the initial search results to cluster results associated with the channel by copying the initial search results, identifying results associated with a channel to include in the cluster, determining whether to include the channel in the cluster, determining a position in the modified search results to include the cluster, and including the cluster at the determined position in the modified search results. The search result modification module 210 can determine whether to include the channel in the cluster based on the results associated with the channel in the initial search results. The search result modification module 210 can determine a position in the modified search result to include the cluster based on a score calculated based on the results associated with the channel in the initial search results. The search result modification module 210 can include the cluster at the determined position in the modified search result by including the cluster at the determined position and updating the results following the cluster in the modified search results.

The search result presentation module 215 can provide or present a user interface window to provide the search result associated with the topic of interest. The user interface window can include a subset of results in the initial or modified group of search results or all the results in the initial or modified group of search results. If clustering was performed, the search result presentation module 215 will present the modified search results that cluster the results associated with a same channel. If clustering was not performed, the search result presentation module 215 will present the initial search results that do not cluster results associated with a same channel.

Figure 3:
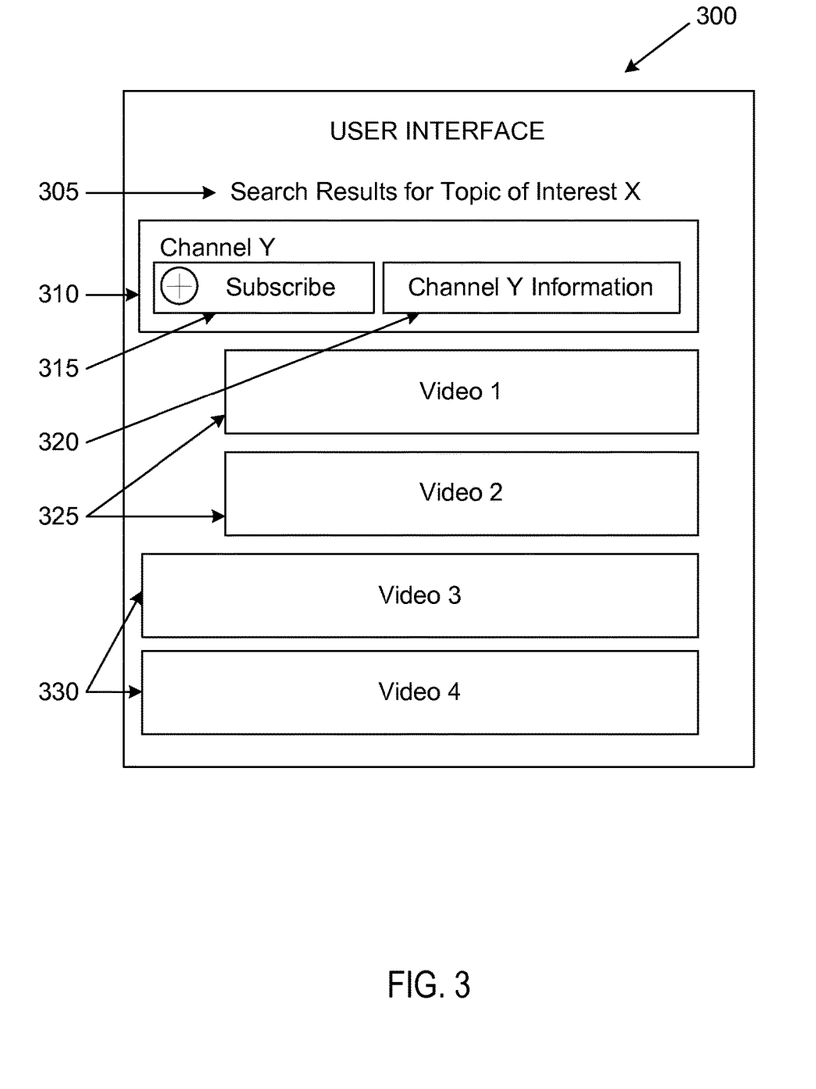
FIG. 3 illustrates a user interface, in accordance with one embodiment of the present disclosure.

FIG. 3 is an example user interface 300 in accordance with one embodiment of the present disclosure. For example, a user can be presented with the user interface 300 in response to a user searching for a topic of interest on a content hosting service. In another example, the user can be presented with the user interface 300 in response to the user providing the topic of interest in a wizard. In yet another example, the user can be presented with the user interface 300 in response to the user providing the topic of interest in a guide. In yet another example, the user can be presented with the user interface 300 when the user chooses to view channels and/or selections of data content about a predefined topic. The user interface 300 can be a web page, a GUI of an application (e.g., a mobile app), a GUI portion embedded in a third party web page, etc.

The user interface 300 includes search results 305, channel result 310, media items 325 associated with channel 310, and additional media items 330. Search results 305 can be presented in a window in user interface 300 in response to a user request for a topic of interest. Search results 305 can include a list of results, such as channels and/or media items, that are related to or associated with the topic of interest. For example, if a user searched for topic of interest X, search results 305 presented will be related to topic of interest X. In some embodiments, search results 305 include an indication of the topic of interest requested in the user request. For example, search results 305 include "Search Results for Topic of Interest X" as a header to inform a viewer of the user interface 300 that the search results are related to topic of interest X.

Channel result 310 can be a channel related to the topic of interest. A channel can be one or more media items available from a common source or one or more media items having common properties, subject, or theme. Channel result 310 can include the name of the channel. For example, the name of channel result 310 is "Channel Y." Channel result 310 can optionally include a subscribe element 315. Subscribe element 315 can allow a user to easily subscribe to the channel in channel result 310 by selecting (e.g., clicking, touching or otherwise activating) the subscribe element 315. The subscribe element 310 can be a button, a check box or any other GUI element. Upon selecting the subscribe element 315, the user will be subscribed to the channel represented by channel result 310. Channel result 310 can optionally include channel information 320. Channel information 320 can include information about the channel, such as the total number of media items associated with the channel, the number of media items in search results 305 that are associated with channel result 310, the number of media items in the channel that are associated with the topic of interest, the number of users subscribed to the channel, etc. Channel 310 can optionally include a link to the channel such that a user can select the link and be able to view information about the channel, subscribe to the channel, consume one or more selections of data content associated with the channel, etc.

Media items 325 are associated with the channel in channel result 310. The media items 325 can all be uploaded by a user associated with the channel in channel result 310.

Each media item 325 can be a video, a blog, a newsletter, an audio selection, or any other type of media item that can be presented to a user of a content hosting service. Each media item 325 can include the name of the media item, such as "Video 1" and "Video 2. Each media item 325 can include a link to the media item such that a user can activate the link and be able to consume the media item. Each media item 325 associated with the channel can presented in the user interface 300 to convey to a user that the media items 325 and channel result 310 are grouped or clustered. For example, in user interface 300, each media item 325 associated with channel result 310 is indented underneath channel result 310 to convey to the user that "Video 1" and "Video 2" belong to "Channel Y." Other graphical treatments of the media items 325 and channel result 310 can be used to indicate that the media items 325 and channel result 310 are grouped or clustered without departing from the scope of the present disclosure. For example, a box can be put around media items 325 and channel result 310, a coloring scheme can be used for media items 325 and channel result 310, an outline can be used for media items 325 and channel result 310, a logical presentation of media items 325 and channel result 310 can be made (e.g., placed adjacent to each other), etc.

Additional media items 330 are not associated with the channel in channel result 310. Additional media items 330 are associated with the topic of interest requested by the user. Each additional media item 330 can be a video, a blog, a newsletter, an audio selection, or any other type of media item that can be presented to a user of a content hosting service. Each additional media items 330 can include the name of the media item, such as "Video 3" and "Video 4. Each additional media item 330 can include a link to the media item such that a user can select the link and be able to consume the media item. Each additional media item 330 can presented in the user interface 300 to convey to a user that the additional media items 330 are not grouped or clustered with channel result 310. For example, in user interface 300, each additional media item 330 is not indented and is lined up with channel result 310 to convey to the user that "Video 3" and "Video 4" do not belong to "Channel Y."

Figure 4:
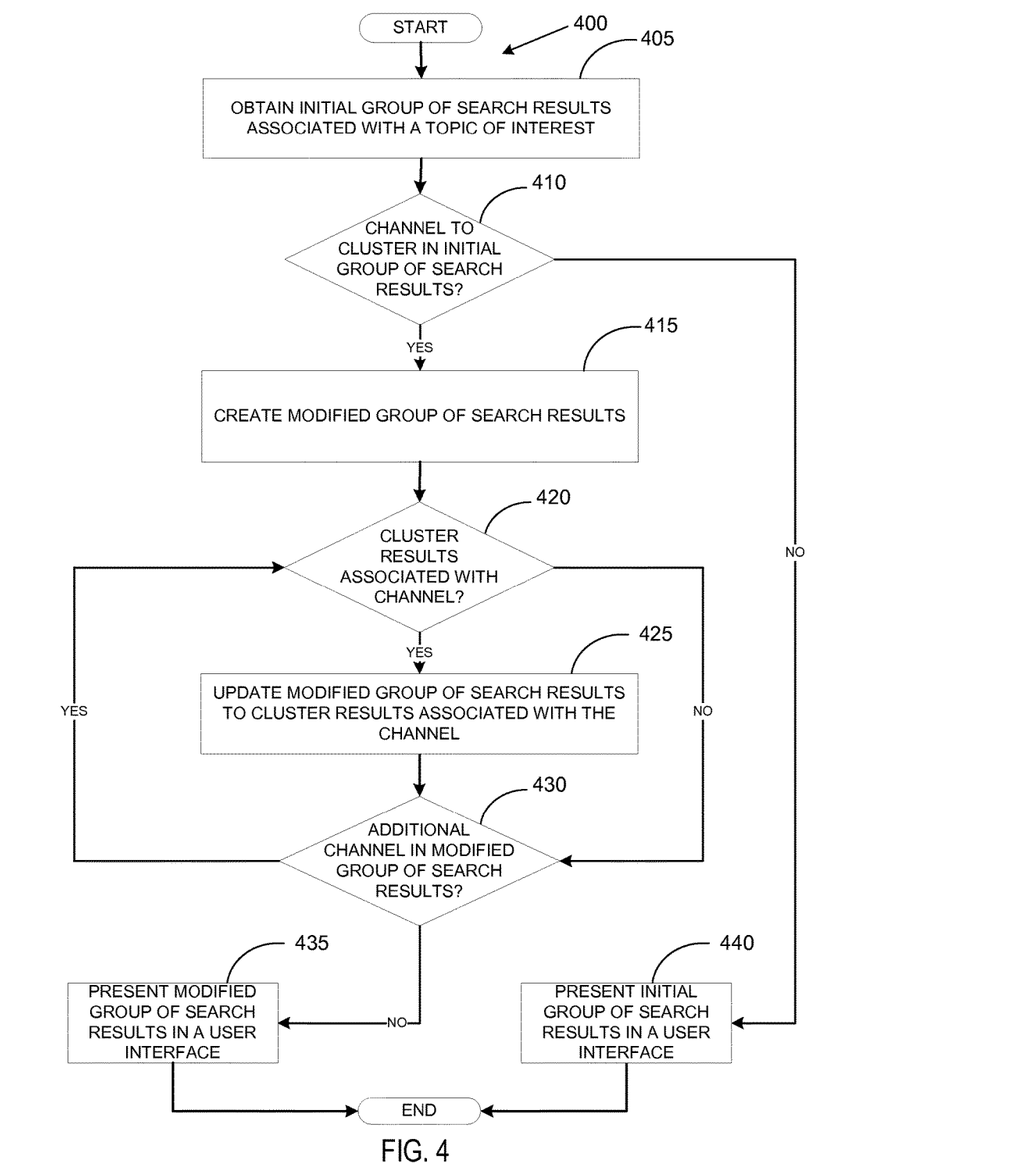
FIG. 4 is a flow diagram illustrating one embodiment for a method of clustering results of a same channel, in accordance with one embodiment of the present disclosure.

FIG. 4 is a flow diagram illustrating an embodiment for a method 400 of clustering results from a same channel. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 is performed by a server (e.g., the content server 110 of FIG. 1).

At block 405, processing logic obtains initial group of search results associated with a topic of interest. The initial group of search results can be obtained in response to a user request for the topic of interest (e.g., via one or more keywords or one or more phrases). The initial group of search results can include one or more results associated with the topic of interest. The results can include media items, a channel associated with one or more media items, etc. For example, if a topic of interest is snowboarding, the initial group of search results will include one or more results related to snowboarding. In one embodiment, the topic of interest is submitted via a user interface, such as in a search field of the user interface, etc. For example, a user entering the topic of snowboarding in a search field will cause a search result to be obtained for snowboarding.

In one embodiment, processing logic obtains the initial group of search results for the search query by receiving results from a content hosting service, a computing system, a content server, etc. In an alternate embodiment, processing logic obtains the initial group of search results of the search query by requesting results from a content hosting service, a computing system, a content server, etc. In one embodiment, processing logic obtains the initial group of search results by sending a request including the topic of the search query to a sorting tree and receiving results from the sorting tree.

At block 410, processing logic determines if there is a channel to cluster in the initial search results. Processing logic can determine if there is a channel to cluster in the initial search results by accessing the initial search results, determining if at least one of the results is a channel, and if at least one of the results is a channel, determining if there are multiple results associated with the channel. If processing logic determines that there is a channel in the search result and there are multiple results associated with the channel, the method 400 proceeds to block 415. If processing logic determines that there is no channel in the search result or that a channel does not have multiple results associated with it, the method 400 proceeds to block 440.

At block 415, processing logic creates a modified group of search results. In one embodiment, processing logic creates the modified group of search results by copying the initial group of search results. In an alternate embodiment, processing logic creates the modified group of search results by renaming the initial group of search results such that the initial group of search results is modified. In some embodiments, block 415 is optional. In these embodiments, the method 400 proceeds from block 410 to block 420.

At block 420, processing logic determines whether to cluster results associated with a channel. In one embodiment, processing logic determines whether to cluster results associated with a channel based on a position range of the results associated with the channel. The position range can be a variable range of the position of results in the search result associated with a channel, such as 1 through 10. If a predetermined number of results are within the position range, processing logic determines to cluster results associated with the channel. For example, if the position range is 1 through 10 and the predetermined number of results is 2, processing logic will determine to cluster results associated with a channel if 2 or more results associated with the channel are within positions 1 through 10 in the search result.

In an alternate embodiment, processing logic determines whether to cluster results associated with a channel based on a ranking position of one or more of the results associated with the channel. The ranking position of a result is the ranking or position of the result in a group of search results. For example, a result that is $4^{th}$ in a group of search results has a ranking position of 4. If a predetermined number of results associated with a channel are above a certain ranking position, such as 20, processing logic can determine to cluster results associated with the channel. For example, if the ranking position is 20 and the predetermined number of results is 2, processing logic determines to cluster results associated with the channel if 2 or more results associated with the channel are ranked above ranking position 20.

In another alternate embodiment, processing logic determines whether to cluster the results associated with a channel based on the topicality of the channel. The topicality of the channel defines a relation of the topic of interest to one or more topics associated with the channel. The topicality of the channel can be included in the modified group of search results and processing logic can obtain the topicality for a channel from the modified group of search results. If the topicality of a channel is above a predefined threshold, processing logic determines to cluster the results associated with the channel. If the topicality of a channel is below a predefined threshold, processing logic determines not to cluster the results associated with the channel. For example, for a topic of interest that is "snowboarder X," if a channel has a topic of "snowboarder X," then the topicality of the channel is high, such as 100%, because the topic of interest exactly matches the topic of the channel. In this example, if the predefined threshold is 50%, processing logic will determine to cluster the results associated with the channel.

At block 425, processing logic updates the modified group of search results to cluster results associated with a same channel. In one embodiment, processing logic updates the modified group of search results to cluster results associated with the channel by identifying results associated with a channel to include in the cluster, determining whether to include the channel in the cluster, determining a position in the search result to include the cluster, and including the cluster at the determined position.

Processing logic can identify results associated with a channel to include in the modified group of search results by searching the modified group of search results for results that include the identifier of the channel. In one embodiment, processing logic searches a subset of the modified group of search results, such as a predefined number of results in the modified group of search results for the results that include the identifier of the channel, and includes the results with the identifier of the channel in the cluster. For example, processing logic searches the first 100 results in the search result. In another example, processing logic searches the first page of the modified group of search results.

In an alternate embodiment, processing logic searches all the results in the modified group of search results for entries that include the identifier of the channel. For example, if the search result includes 1000 results, processing logic searches all 1000 results. In this embodiment, processing logic can include all the identified results or a subset of the identified results in the cluster. Processing logic can determine the subset of the identified results based on a topicality of the media item associated with each result, a ranking position of each result, etc. The topicality of the media item associated with each result defines a relation of the topic of interest to the one or more topics associated with the media item. The topicality of each media item to the topic of interest can be included in the initial and/or modified group of search results and processing logic can obtain the topicality for a media item from the initial and/or modified group of search results. If the topicality of a media item is above a predefined threshold, the result associated with media item can be included in the subset. For example, the topic of interest is "snowboarder X." If a media item associated with a result has a topic of "snowboarder X," then the topicality of the media item is high, such as 100%, because the topic of interest exactly matches the topic of the media item. If a media item associated with a result has a topic of interest of "snowboarding," the topicality of the media item is slightly lower, such as 80%, because the topic of the media item is related but does not exactly match the topic of interest. If a media item associated with a result has a topic of interest of "Lake Tahoe," then the topicality of the media item is lower, such as 30%, because the topic of the media item is slightly related to the topic of interest. Using the above examples, if the predefined threshold is a topicality of 70%, the result associated with the media item with a topic of "snowboarder X" and the result associated with the media item with a topic of "snowboarding" will be included in the cluster but the result associated with the media item with a topic of "Lake Tahoe" will not be included in the cluster.

Processing logic can determine the subset based on a ranking position of each result by including the identified results that have a ranking or position that is above a predefined value. For example, only results that are ranked in the first 20 results in the modified group of search results are included in the cluster. In this example, a result that has a ranking of 21 will not be included in the cluster.

In one embodiment, processing logic determines whether to include the channel in the cluster based on the identified results associated with the channel. In this embodiment, processing logic determines to include the channel in the cluster if the number of identified results associated with the channel is above a predefined threshold. In this embodiment, processing logic determines to not include the channel in the cluster if the number of identified results associated with the channel is below the predefined threshold. For example, if the predefined threshold is 5 channels, and the number of identified results associated with the channel is 3, the channel will not be included in the cluster. In another example, if the predefined threshold is 5 channels, and the number of identified results associated with the channel is 5, the channel will be included in the cluster.

In an alternate embodiment, processing logic determines whether to include the channel in the cluster based on the results in the modified group of search results that are associated with the channel. In this embodiment, processing logic determines to include the channel in the cluster if the number of results associated with the channel in the modified group of search results is above a predefined threshold. For example, if the predefined threshold is 10 channels, the number of identified results associated with the channel is 5, and the number of results associated with the channel in the modified group of search results is 15, the channel will be included in the cluster because the number of channels in the modified group of search results is above the predefined threshold. In this embodiment, processing logic determines to not include the channel in the cluster if the number of results associated with the channel in the overall search result is below the predefined threshold. For example, if the predefined threshold is 15 channels, the number of identified results associated with the channel is 3, and the number of results associated with the channel in the modified group of search results is 10, the channel will not be included in the cluster.

In another alternate embodiment, processing logic determines whether to include the channel in the cluster based on the quality of the channel. The quality of the channel can be based on the ranking of media items associated with the channel in the group of search results (e.g., initial group of search results or modified group of search results). In one embodiment, the quality of the channel is equal to the ranking of lowest media item in the group of search results. For example, if the group of search results includes 3 media items associated with channel X: media item 1 as result 1, media item 2 as result 10, and media item 3 as result 100, the quality of channel X is 100. In this embodiment, if the quality of the channel is above a predefined value (e.g., the value of the quality is a larger number than the predefined value), processing logic can determine not to include the channel in the cluster. Using the previous example, the quality of channel X is 100, and the predefined threshold is 10, channel X will not be included in the cluster because the quality of the channel is above the predefined value. In an alternate embodiment, the quality of the channel is equal to the ranking of the highest media item in the group of search results. For example, if the group of search results includes 3 media items associated with channel X: media item 1 as result 1 in, media item 2 as result 10, and media item 3 as result 100, the quality of channel X is 1. If the quality of the channel is below a predefined threshold, processing logic can determine to include the channel in the cluster. Using the previous example, the quality of channel X is 1, and the predefined threshold is 10, channel X will be included in the cluster because the quality of the channel is above the predefined value. In another embodiment, the quality of the channel is equal to the average of the rankings of the media items associated with the channel in the group of search results. For example, if the group of search results includes 3 media items associated with channel X: media item 1 as result 1, media item 2 as result 10, and media item 3 as result 100, the quality of channel X is (1+10+100)/3=37. In this embodiment, if the quality of the channel is above a predefined value, processing logic can determine not to include the channel in the cluster. Using the previous example, the quality of channel X is 37, and the predefined threshold is 10, channel X will not be included in the cluster because the quality of the channel is above the predefined value. The quality of the channel can be based on other aspects of the media items associated with the channel without departing from the scope of the present disclosure.

In yet another embodiment, processing logic determines to always include the channel in the cluster. In this embodiment, processing logic updates the modified group of search results to include the channel in the cluster.

Processing logic can determine a position in the modified group of search results to include the cluster based on a score. In one embodiment, the score associated with the channel is the highest ranking or position of media items associated with the channel. In this embodiment, the score is the position in the modified group of search results for the cluster. For example, if channel X has a media item with a ranking of 2 (position at result 2), a media item with a ranking of 6 (position at result 6), the score of the channel is 2 and the position of the cluster is 2. In an alternate embodiment, the score associated with the channel is a geomean of the ranking or position of media items associated with the channel. In this embodiment, the score is the position in the search result for the cluster. The geomean can be calculated as a mean of the ranking of at least two of the media items associated with the channel. The geomean can be rounded (e.g., rounded up, rounded down, etc.) if the mean is not a whole number. The media items included in the geomean calculation can be all the media items in the initial or modified group of search results or a subset of the initial or modified group of search results (e.g., first page of search results, first 10 search results, etc.). For example, if a channel X has a media item with a ranking of 2 and a media item with a ranking of 5, the geomean will be calculated as (2+5)/2=3.5. In this example, the position of the cluster will be rounded to 3 or 4. In another embodiment, the score associated with the channel is based on a score smearing approach. The score smearing approach used to create the score associated with the channel can be selected based on search query information. The search query information can be obtained by running search queries (e.g., live traffic experiments), obtaining information from past search queries, etc. The score smearing approaches can include an arithmetic mean, weighted average, linear combination, etc.

Processing logic can include the cluster at the determined position by updating the modified group of search results to include the cluster at the determined position and updating the results in the modified group of search results that follow the cluster. For example, an initial group of search results initially has media item 1 associated with channel X, media item 2 associated with channel Y, channel Y, media item 3 associated with channel Y, and media item 4 associated with channel Z. In this example, if a cluster for channel Y has been determined at position 2, the modified group of search results will be: media item 1 associated with channel X, channel Y, media item 2 associated with channel Y, media item 3 associated with channel Y, and media item 4. Processing logic can further update the search result to convey to the user that the results in the cluster are grouped or clustered by presenting the channel as the title of the cluster, the heading of the cluster, or the top or first result of the cluster and listing the results in the cluster adjacent to each other. In some embodiments, processing logic further updates the modified group of search results by indenting the results in the cluster (e.g., channel is not indented and all results associated with the channel are indented), by drawing a box or outline around the results in the cluster, by changing the color of the results in the cluster, by putting the results in the cluster in an outline or bullet form, by changing the font of the results in the cluster, etc.

At block 430, processing logic determines if there is an additional channel in the modified group of search results. Processing logic can determine if there is an additional channel in the modified group of search results by accessing the modified group of search results and determining if a determination of whether to cluster results associated with a channel has been made for each channel in the modified group of search results. If processing logic determines that there is an additional channel in the modified group of search results, the method 400 returns to block 420 to determine whether to cluster results associated with the next channel in the modified group of search results. If processing logic determines that there is no additional channel in the modified group of search results, the method 400 proceeds to block 435.

At block 435, processing logic presents the modified group of search results in a user interface. The user interface can include a window or any other user interface element to provide the modified group of search results to a user. The user interface can include a list of a subset of the results in the modified group of search results or all the results in the modified group of search results. The modified group of search results presented will cluster the results associated with a same channel. An example user interface that includes a modified group of search results that clusters the results associated with a same channel is discussed above in conjunction with FIG. 3.

At block 440, processing logic presents the initial group of search results in a user interface. The user interface can include a window or any other user interface element to provide the initial group of search results to a user. The user interface can include a list of a subset of the results in the initial group of search results or all the results in the initial group of search results. The initial group of search results presented will not cluster the results associated with a same channel.

Figure 5:
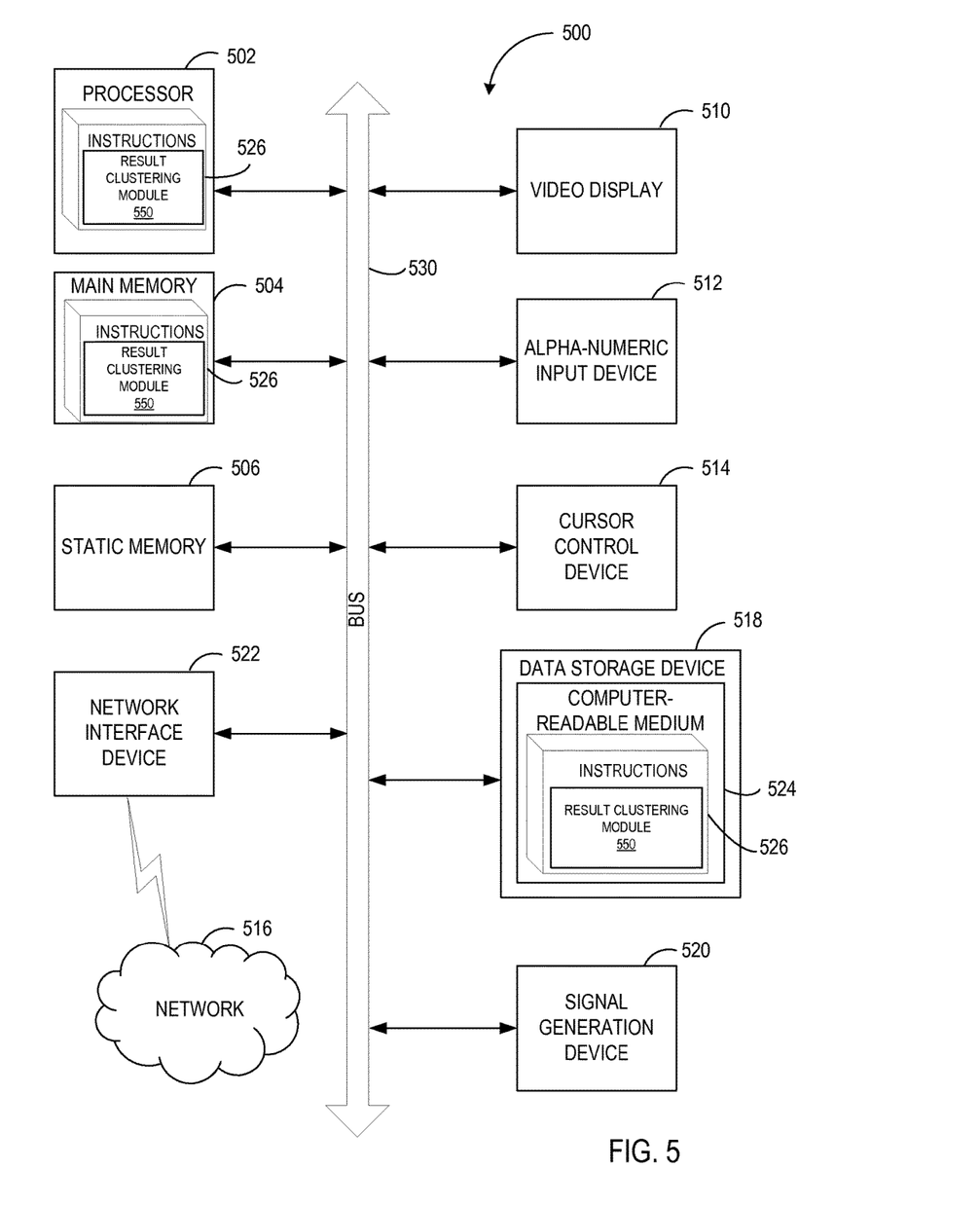
FIG. 5 is a block diagram of an exemplary computer system that may perform one or more of the operations described herein.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 526 for performing the operations and steps discussed herein.

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a computer-readable storage medium 524 on which is stored one or more sets of instructions 526 (e.g., software) embodying any one or more of the methodologies or functions described herein. The instructions 526 may also reside, completely or at least partially, within the main memory 504 and/or within the processor 502 during execution thereof by the computer system 500, the main memory 504 and the processor 502 also constituting computer-readable storage media. The instructions 526 may further be transmitted or received over a network 516 via the network interface device 522.

In one embodiment, the instructions 526 include instructions for a result clustering module 550, which may correspond to result clustering module 120 of FIG. 1, and/or a software library containing methods that clusters results from a same channel. While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying", "presenting," "receiving," "modifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
providing a user interface to enable a user to submit a search query pertaining to a topic of interest;
obtaining, by a processing device, an initial plurality of search results based on the search query pertaining to the topic of interest, the initial plurality of search results are obtained in an order defined by a relation of each of the plurality of search results to the topic of interest;
determining, by the processing device, whether to perform clustering on the initial plurality of search results, wherein determining whether to perform clustering comprises determining whether the initial plurality of search results comprises at least a first result associated with a channel of a plurality of channels and a second result associated with the channel of the plurality of channels, wherein the channel comprises a plurality of media items, wherein the first and second results pertain to first and second media items of the plurality of media items of the channel, and wherein the initial plurality of search results comprises one or more third results comprising one or more videos that are not associated with any of the plurality of channels;
upon determining not to perform clustering on the initial plurality of search results, providing, by the processing device, a modified user interface including the initial plurality of search results ordered based on a relation of each of the initial plurality of search results to the topic of interest; and
upon determining to perform clustering on the initial plurality of search results, providing, by the processing device, a modified user interface including a modified plurality of search results comprising the first result and the second result that are associated with the channel, and the one or more videos that are not associated with any of the plurality of channels, the modified user interface including the modified plurality of search results ordered based at least in part on a relation of each of the modified plurality of search results to the channel, in order to enable the user to ascertain which of the modified plurality of search results are associated with the channel, and to select any media items corresponding to the search results associated with the channel,
wherein the user interface is to position the first result in the modified plurality of search results adjacent to a location of the second result in the modified plurality of search results, in order to visually illustrate that both the first result and the second result are part of a cluster related to the channel, and wherein the user interface is also to position the one or more videos at a location that visually illustrates that the one or more videos are not part of any cluster related to any of the plurality of channels.

2. The method of claim 1, wherein determining whether to perform clustering on the initial plurality of search results is further based on a position range of the first and second results associated with the channel.

3. The method of claim 1, wherein determining whether to perform clustering on the initial plurality of search results is further based on a ranking position of the first and second associated with the channel.

4. The method of claim 1, wherein determining whether to perform clustering on the initial plurality of search results is further based on a topicality of the channel.

5. The method of claim 1, further comprising:
creating the modified plurality of search results by updating the position of the first result to be adjacent to the position of the second result.

6. The method of claim 5, wherein creating the modified plurality of search results further comprises:
identifying the first result associated with the channel and the second result associated with the channel;
determining whether to include the channel in the modified plurality of search results;
determining the position of the first result in the modified plurality of search results;
determining the position of the second result in the modified plurality of search results;
placing, in the modified plurality of search results, the first result at the determined position of the first result; and
placing, in the modified plurality of search results, the second result at the determined position of the second result.

7. The method of claim 6, wherein determining whether to include the channel in the modified plurality of search results is based on at least one of: a result associated with the channel or a quality of the channel.

8. The method of claim 6, wherein determining the position of the first result in the modified plurality of search results is based on at least one of: a ranking of each of a plurality of results associated with the channel or a geomean of the ranking of each of the plurality of results associated with the channel.

9. A non-transitory computer readable storage medium having instructions that, when executed by a processing device, cause the processing device to perform operations comprising:
providing a user interface to enable a user to submit a search query pertaining to a topic of interest;
obtaining an initial plurality of search results based on the search query pertaining to the topic of interest, the initial plurality of search results are obtained in an order defined by a relation of each of the plurality of search results to the topic of interest;
determining whether to perform clustering on the initial plurality of search results, wherein determining whether to perform clustering comprises determining whether the initial plurality of search results comprises at least a first result associated with a channel of a plurality of channels and a second result associated with the channel of the plurality of channels, wherein the channel comprises a plurality of media items, wherein the first and second results pertain to first and second media items of the plurality of media items of the channel, and wherein the initial plurality of search results comprises one or more third results comprising one or more videos that are not associated with any of the plurality of channels;
upon determining not to perform clustering on the initial plurality of search results, providing a modified user interface including the initial plurality of search results ordered based on a relation of each of the initial plurality of search results to the topic of interest; and
upon determining to perform clustering on the initial plurality of search results, providing a modified user interface including a modified plurality of search results comprising the first result and the second result that are associated with the channel, and the one or more videos that are not associated with any of the plurality of channels, the modified user interface including the modified plurality of search results ordered based at least in part on a relation of each of the modified plurality of search results to the channel, in order to enable the user to ascertain which of the modified plurality of search results are associated with the channel, and to select any media items corresponding to the search results associated with the channel, wherein the user interface is to position the first result in the modified plurality of search results adjacent to a location of the second result in the modified plurality of search results, in order to visually illustrate that both the first result and the second result are part of a cluster related to the channel, and wherein the user interface is also to position the one or more videos at a location that visually illustrates that the one or more videos are not part of any cluster related to any of the plurality of channels.

10. The non-transitory computer readable storage medium of claim 9, wherein determining whether to perform clustering on the initial plurality of search results is further based on a position range of the first and second results associated with the channel.

11. The non-transitory computer readable storage medium of claim 9, wherein determining whether to perform clustering on the initial plurality of search results is further based on a ranking position of the first and second results associated with the channel.

12. The non-transitory computer readable storage medium of claim 9, wherein determining whether to perform clustering on the initial plurality of search results is further based on a topicality of the channel.

13. The non-transitory computer readable storage medium of claim 9, wherein the instructions, when executed by the processing device, cause the processing device to perform further operations comprising creating the modified plurality of search results by updating the position of the first result to be adjacent to the position of the second result.

14. The non-transitory computer readable storage medium of claim 13, wherein to create the modified search result, the instructions, when executed by the processing device, cause the processing device to perform operations comprising:
identifying the first result associated with the channel and the second result associated with the channel;
determining whether to include the channel in the modified plurality of search results;
determining the position of the first result in the modified plurality of search results;
determining the position of the second result in the modified plurality of search results;
placing, in the modified plurality of search results, the first result at the determined position of the first result; and
placing, in the modified plurality of search results, the second result at the determined position of the second result.

15. The non-transitory computer readable storage medium of claim 14, wherein determining whether to include the channel in the modified plurality of search results is based on at least one of: a result associated with the channel or a quality of the channel.

16. The non-transitory computer readable storage medium of claim 14, wherein determining the position of the first result in the modified plurality of search results is based on at least one of: a ranking of each of a plurality of results associated with the channel or a geomean of the ranking of each of the plurality of results associated with the channel.

17. A computing device comprising:
a memory; and
a processing device coupled to the memory, wherein the processing device is configured to:
provide a user interface to enable a user to submit a search query pertaining to a topic of interest;
obtain an initial plurality of search results based on the search query pertaining to the topic of interest, the initial plurality of search results are obtained in an order defined by a relation of each of the plurality of search results to the topic of interest;
determine whether to perform clustering on the initial plurality of search results, wherein determining whether to perform clustering comprises determining whether the initial plurality of search results comprises at least a first result associated with a channel of a plurality of channels and a second result associated with the channel of the plurality of channels, wherein the channel comprises a plurality of media items, wherein the first and second results pertain to first and second media items of the plurality of media items of the channel, and wherein the initial plurality of search results comprises one or more third results comprising one or more videos that are not associated with any of the plurality of channels;
upon determining not to perform clustering on the initial plurality of search results, provide a modified user interface including the initial plurality of search results ordered based on a relation of each of the initial plurality of search results to the topic of interest; and
upon determining to perform clustering on the initial plurality of search results, provide a modified user interface including a modified plurality of search results comprising the first result and the second result that are associated with the channel, and the one or more videos that are not associated with any of the plurality of channels, the modified user interface including the modified plurality of search results ordered based at least in part on a relation of each of the modified plurality of search results to the channel, in order to enable the user to ascertain which of the modified plurality of search results are associated with the channel, and to select any media items corresponding to the search results associated with the channel,
wherein the user interface is to position the first result in the modified plurality of search results adjacent to a location of the second result in the modified plurality of search results, in order to visually illustrate that both the first result and the second result are part of a cluster related to the channel, and wherein the user interface is also to position the one or more videos at a location that visually illustrates that the one or more videos are not part of any cluster related to any of the plurality of channels.

18. The computing device of claim 17, wherein determining whether to perform clustering on the initial plurality of search results is further based on at least one of: a position range of the first and second results associated with the channel, a ranking position of the first and second results associated with the channel, or a topicality of the channel.

19. The computing device of claim 17, wherein the processing device is further configured to:
create the modified plurality of search results by updating the position of the first result to be adjacent to the position of the second result, wherein to create the modified search result comprises:

identifying the first result associated with the channel and the second result associated with the channel;

determining whether to include the channel in the modified plurality of search results;

determining the position of the first result in the modified plurality of search results;

determining the position of the second result in the modified plurality of search results;

placing, in the modified plurality of search results, the first result at the determined position of the first result; and placing, in the modified plurality of search results, the second result at the determined position of the second result.

20. The computing device of claim 19, wherein determining whether to include the channel in the modified plurality of search results is based on at least one of:

a result associated with the channel or a quality of the channel.

21. The computing device of claim 19, wherein determining the position of the first result in the modified plurality of search results is based on at least one of: a ranking of each of a plurality of results associated with the channel or a geomean of the ranking of each of the plurality of results associated with the channel.

\* \* \* \* \*